US012774223B2

(12) United States Patent
Lee et al.

(10) Patent No.: US 12,774,223 B2
(45) Date of Patent: Oct. 27, 2026

(54) INTEGRATED SYSTEM OF ACTIVATED CARBON REGENERATION AND WATER TREATMENT

(71) Applicant: WINTEC GLOVIS Co., Ltd., Hanam-si (KR)

(72) Inventors: Sanghoon Lee, Seoul (KR); Cheolho Shin, Seoul (KR)

(73) Assignee: WINTEC GLOVIS Co., Ltd., Hanam-si (KR)

( * ) Notice: Subject to any disclaimer, the term of this patent is extended or adjusted under 35 U.S.C. 154(b) by 767 days.

(21) Appl. No.: 17/621,258

(22) PCT Filed: Oct. 28, 2021

(86) PCT No.: PCT/KR2021/015288

§ 371 (c)(1),
(2) Date: Dec. 21, 2021

(87) PCT Pub. No.: WO2023/074944

PCT Pub. Date: May 4, 2023

(65) Prior Publication Data

US 2024/0034645 A1 Feb. 1, 2024

(30) Foreign Application Priority Data

Oct. 27, 2021 (KR) ........................ 10-2021-0144118

(51) Int. Cl.
*B01J 20/20* (2006.01)
*B01J 20/34* (2006.01)
*C02F 1/28* (2023.01)

(52) U.S. Cl.
CPC ............... *C02F 1/283* (2013.01); *B01J 20/20* (2013.01); *B01J 20/3416* (2013.01); *C02F 2303/16* (2013.01)

(58) Field of Classification Search
CPC ...... C02F 1/283; C02F 2303/16; C02F 1/722; C02F 1/02; C02F 2209/02; C02F 2209/06;
(Continued)

(56) References Cited

U.S. PATENT DOCUMENTS 4,203,835 A * 5/1980 Tagashira ................ C02F 11/08 562/513
5,589,599 A * 12/1996 McMullen .............. C10B 53/00 210/769
(Continued)

FOREIGN PATENT DOCUMENTS

CN 104781195 A * 7/2015 ................ C02F 1/28
CN 105498384 A * 4/2016 .......... B01J 20/3416
(Continued)

OTHER PUBLICATIONS

Verderflex_Vantage5000_INT_English_Brochure_2021-03.pdf (Year: 2021).*
(Continued)

*Primary Examiner* — Joseph W Drodge
(74) *Attorney, Agent, or Firm* — Goldilocks ZONE IP LAW

(57) ABSTRACT

Disclosed is an integrated system of activated carbon regeneration and water treatment according to the present invention, and, more particularly, a system that is capable of integrally operating water treatment as well as automatic regeneration of activated carbon by applying facilities intended for automatically discharging spent carbon and putting regenerated carbon, a spent carbon/regenerated carbon transfer device, and so on to a massive water treatment and activated carbon filtration system, so transfer efficiency of the spent carbon and the regenerated carbon can be improved, a loss rate of the spent carbon and the regenerated carbon can be also minimized, wherein the system intro-
(Continued)

duces a post-treatment technology intended for purifying condensate water having a high temperature occurring from a process of regenerating spent activated carbon using superheated steam by putting a decontaminant responding to a high temperature.

3 Claims, 10 Drawing Sheets

(58) Field of Classification Search
CPC .......... C02F 1/28; B01J 20/20; B01J 20/3416; B01J 20/3466; B01J 20/34; B01J 20/3483
See application file for complete search history.

(56) References Cited

U.S. PATENT DOCUMENTS

| | | | | |
|---|---|---|---|---|
| 6,121,179 | A * | 9/2000 | McBrayer, Jr. | B01J 20/345 502/22 |
| 10,751,689 | B2 * | 8/2020 | Goeppert | B01J 20/103 |
| 2002/0179493 | A1 * | 12/2002 | Etter | C10B 57/005 208/143 |
| 2009/0124844 | A1 * | 5/2009 | Muramoto | B01D 65/02 588/320 |
| 2013/0230449 | A1 * | 9/2013 | Doshi | C01B 3/505 422/162 |
| 2020/0171409 | A1 * | 6/2020 | Cho | B01J 20/3441 |

FOREIGN PATENT DOCUMENTS

| | | | | |
|---|---|---|---|---|
| KR | 101326044 | B1 * | 11/2013 | C02F 1/283 |
| KR | 102201983 | B1 * | 1/2021 | C01B 32/36 |

OTHER PUBLICATIONS

Shah et al. 2013, 2 (4), 1078-1088. DOI: 10.7598/cst2013.545 (Year: 2013).*
F. Salvador et al. Microporous and Mesoporous Materials 202 (2015) 259-276 (Year: 2015).*
Ed de Jong, Richard J.A. Gosselink, Chapter 17—Lignocellulose-Based Chemical Products, Bioenergy Research: Advances and Applications, 2014, https://doi.org/10.1016/B978-0-444-59561-4.00017-6 (Year: 2014).*
KR-101326044-B1 translated (Year: 2013).*
KR-102201983-B1 Translated (Year: 2021).*
Y. Zhou et al. Journal of Hazardous Materials 359 (2018) 396â407. https://doi.org/10.1016/j.jhazmat.2018.07.083 (Year: 2018).*
L. He et al. Ecotoxicology and Environmental Safety 208 (2021) 111522 (Year: 2021).*
Saputra, Edy ; Muhammad, Syaifullah ; Sun, Hongqi ; Wang, Shaobin. RSC advances, Jan. 2013, vol. 3 (44), p. 21905-21910 (Year: 2013).*
Escapenet English translation of CN104781195A, Jul. 15, 2015. (Year: 2015).*
Escapenet English translation of CN105498384A, Apr. 20, 2016. (Year: 2016).*

* cited by examiner

[FIG.1]
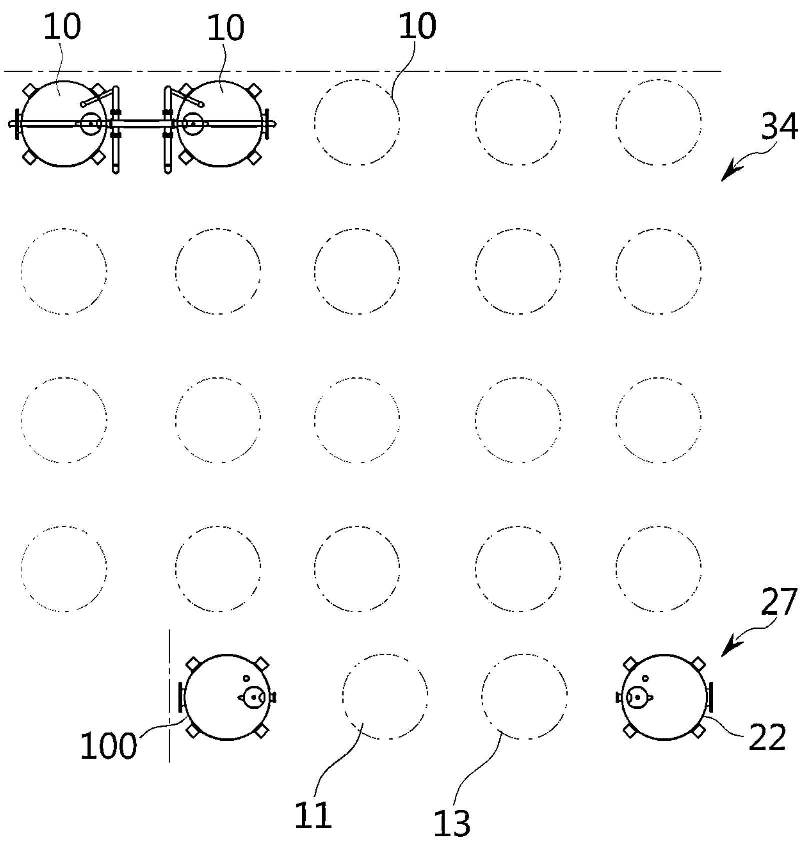

[FIG.2]
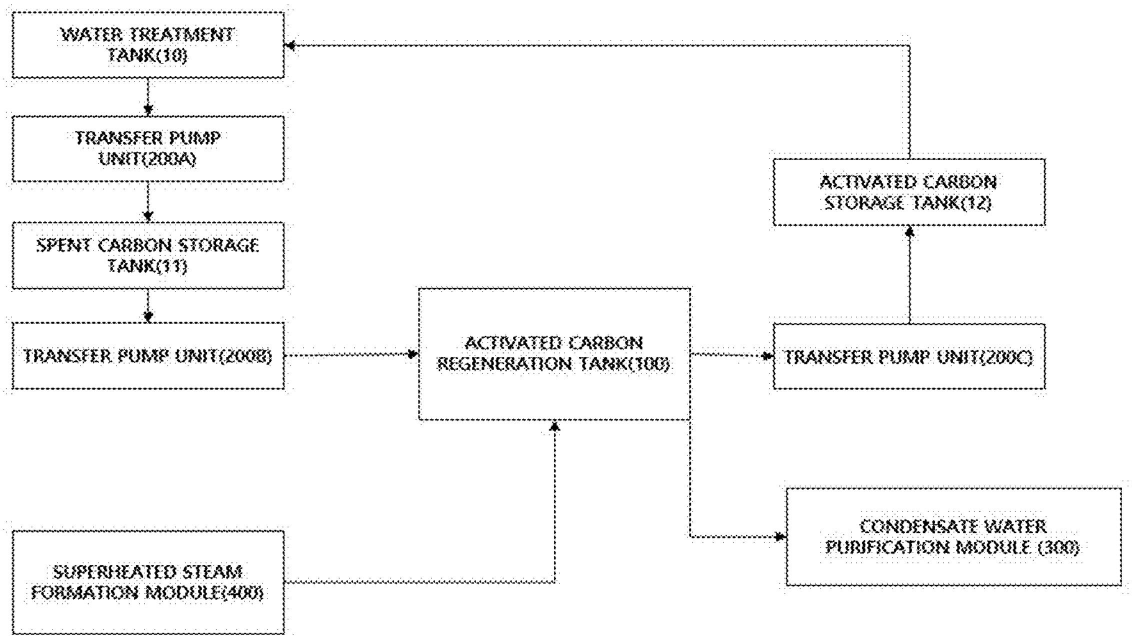
[FIG.3]
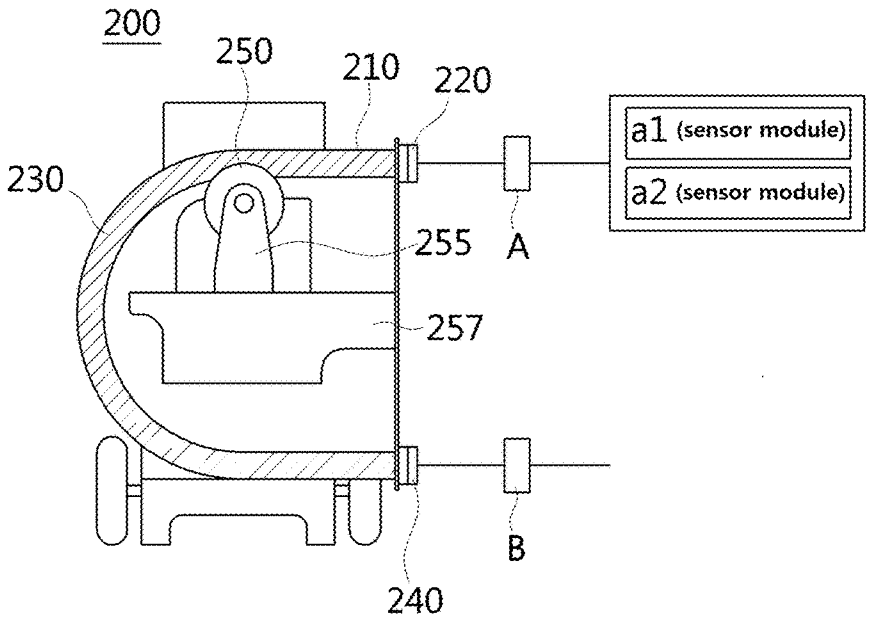

[FIG.4]
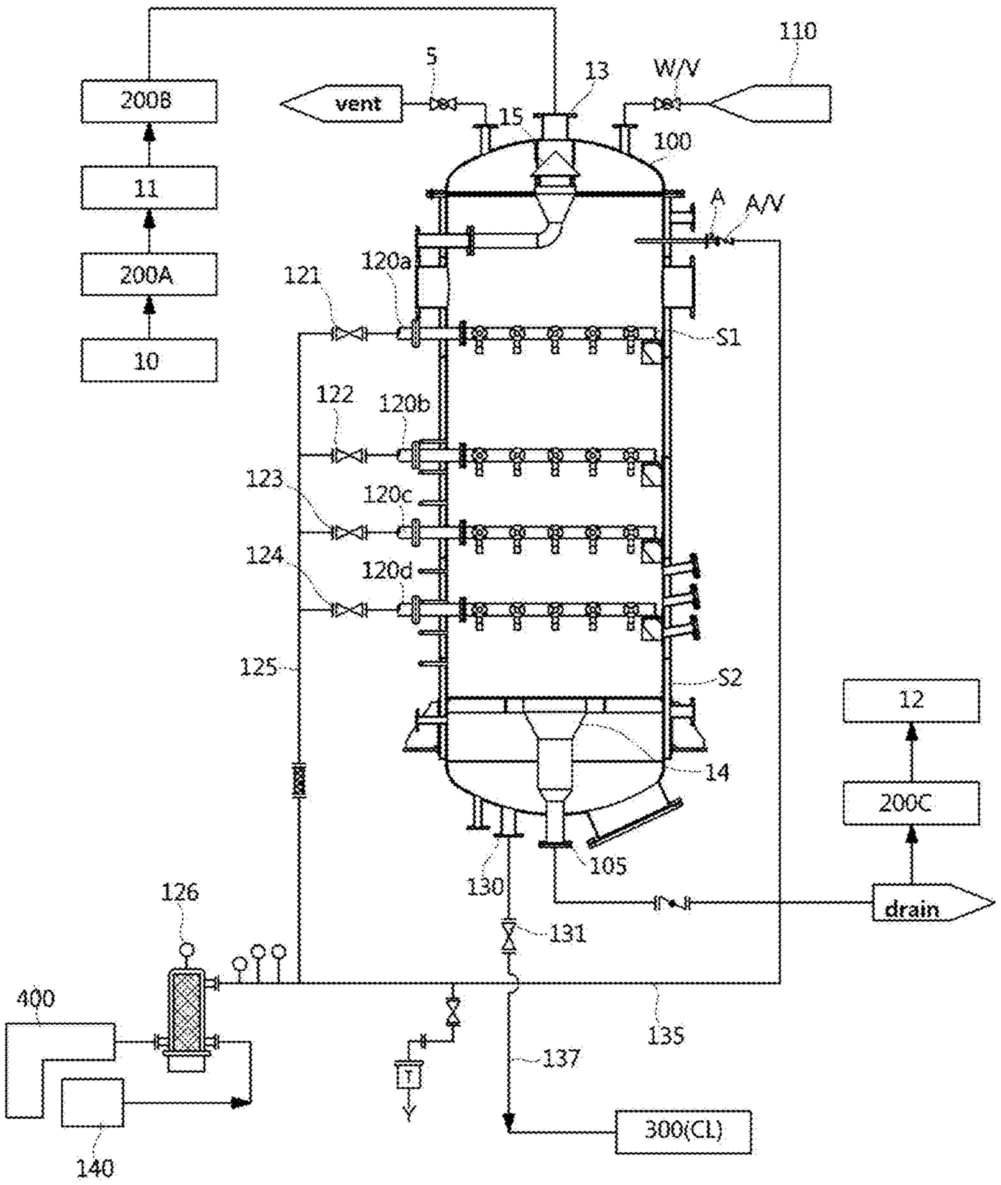

[FIG.5]
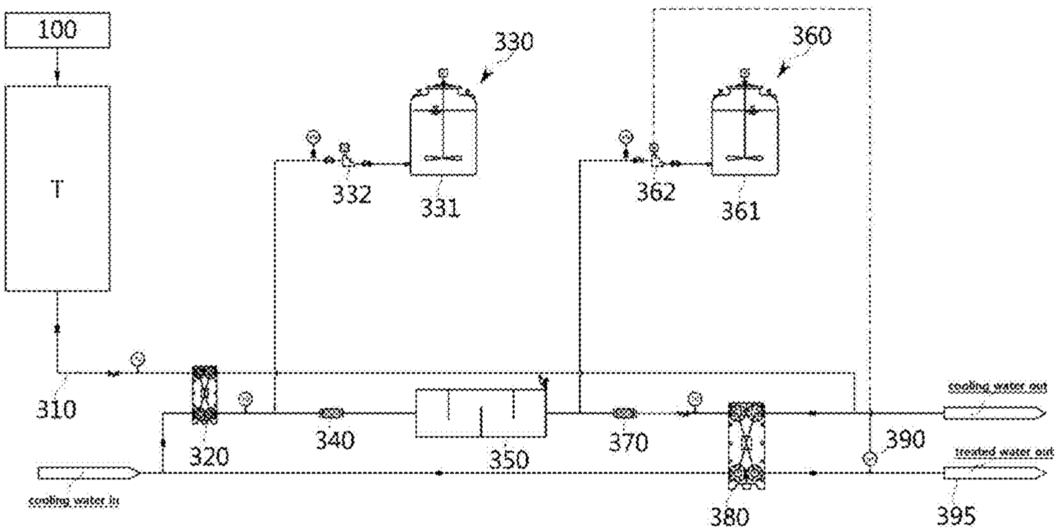

[FIG.6]
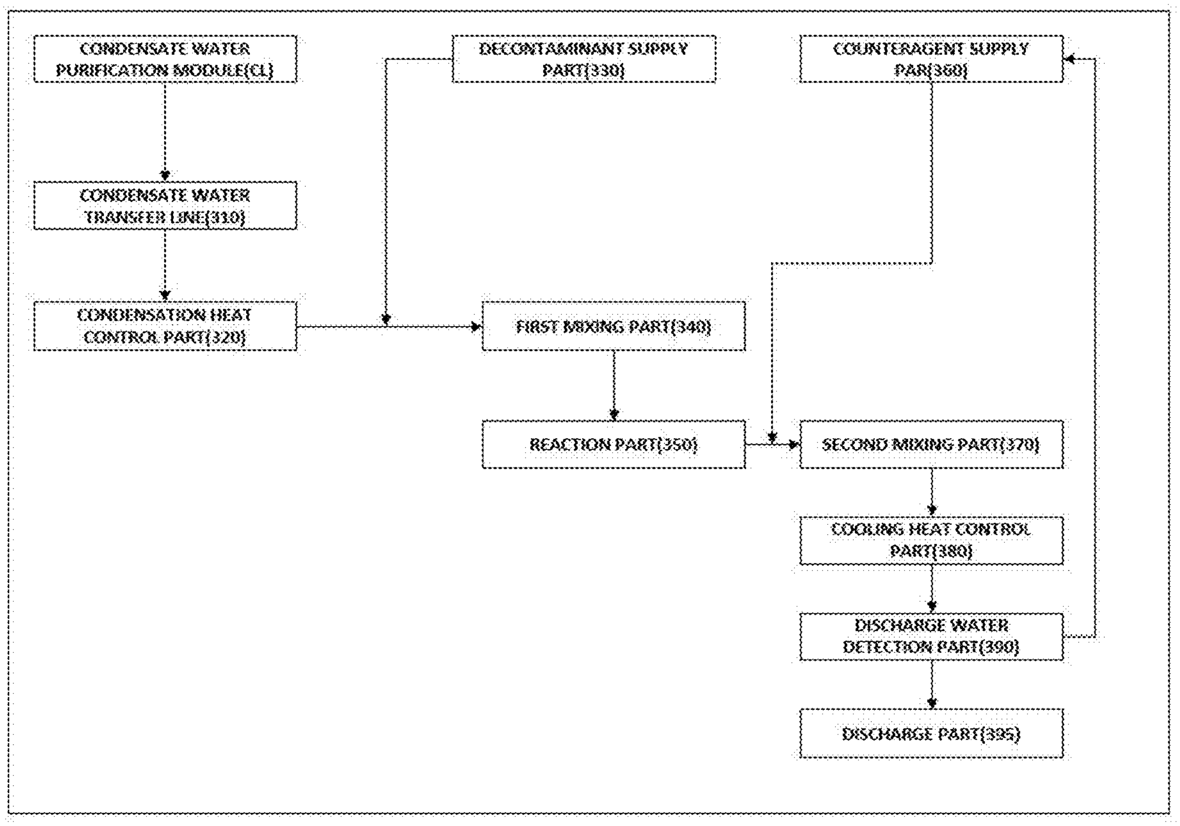

[FIG.7]
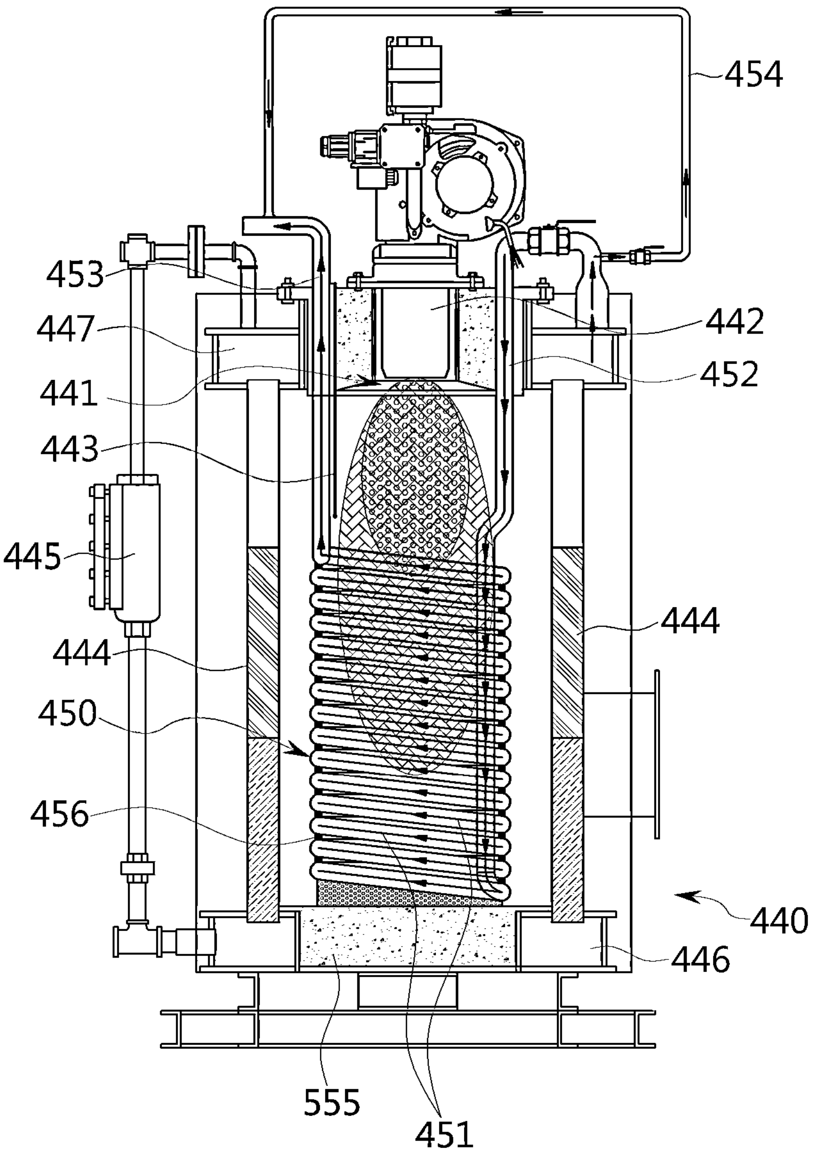

[FIG.8]
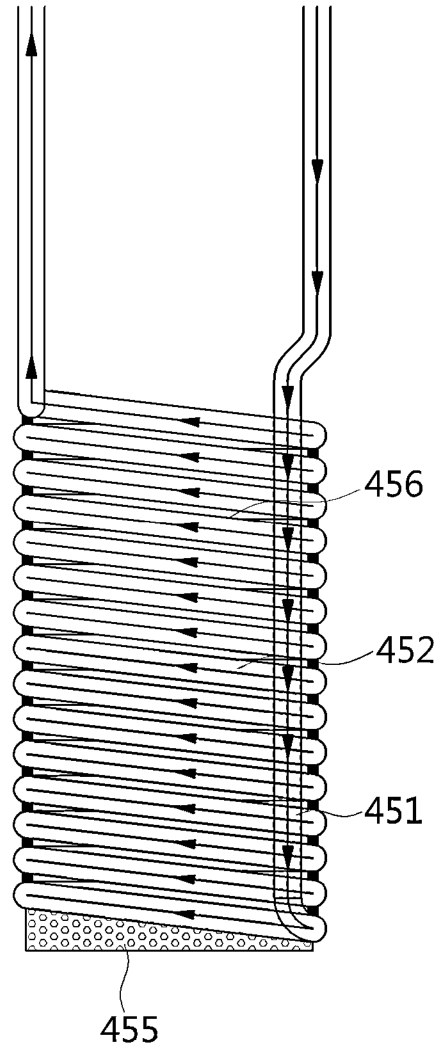

[FIG. 9]
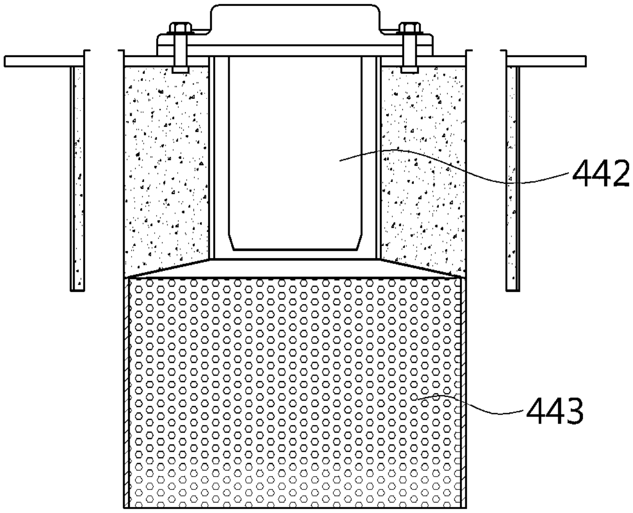
[FIG.10]
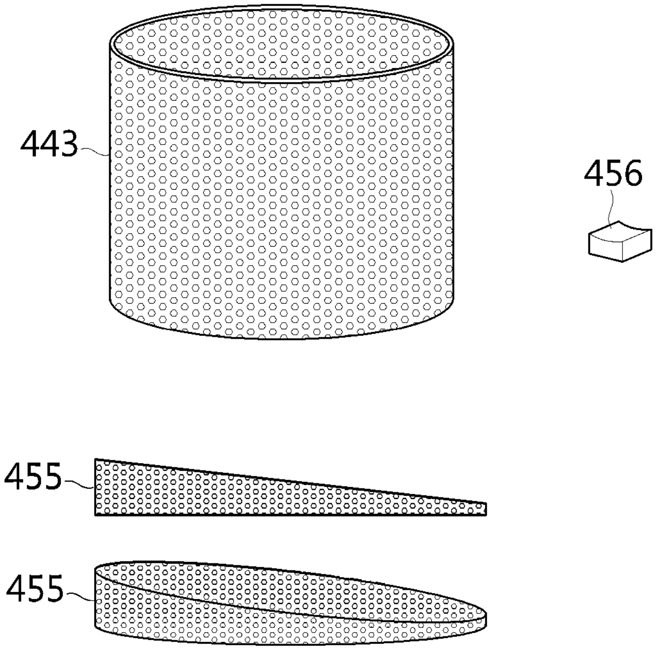

[FIG.11]
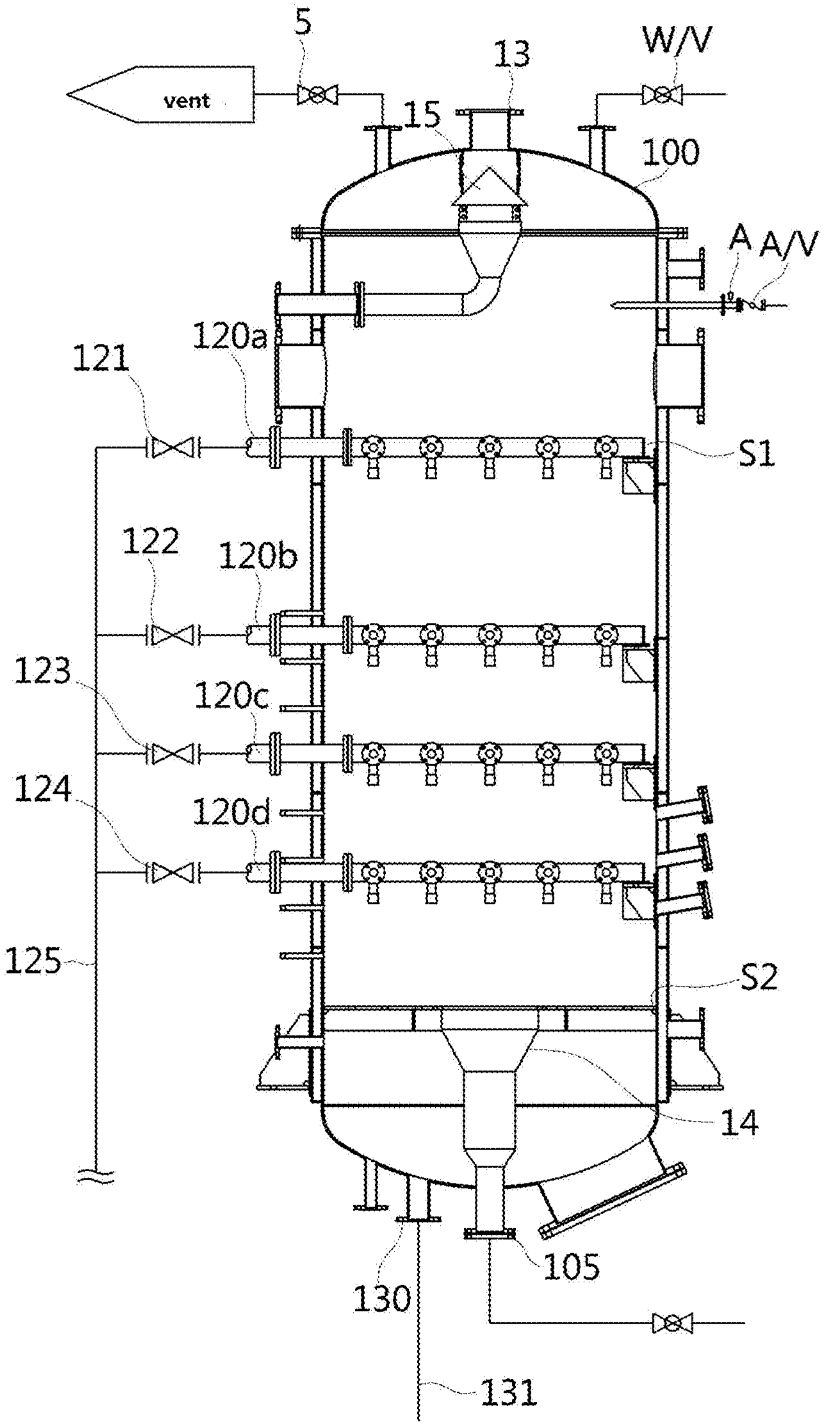

[FIG.12]
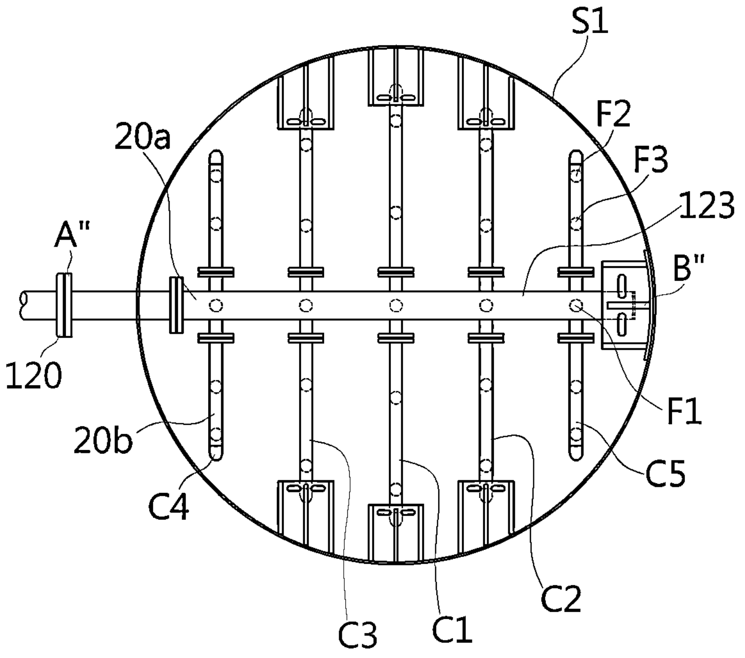

INTEGRATED SYSTEM OF ACTIVATED CARBON REGENERATION AND WATER TREATMENT

CROSS-REFERENCE TO RELATED APPLICATIONS

This application claims the benefit under 35 U.S.C. section 371, of PCT International Application No. PCT/KR2021/015288, filed on Oct. 28, 2021, which claims foreign priority to Korean Patent Application No. 10-2021-0144118, filed on Oct. 27, 2021, in the Korean Intellectual Property Office, both of which are hereby incorporated by reference in their entireties.

TECHNICAL FIELD

The present invention relates to an integrated system of activated carbon regeneration and water treatment, and, more particularly, a system capable of integrally operating the automatic regeneration of activated carbon and water treatment by applying facilities intended for automatically discharging spent carbon and putting regenerated carbon, a spent carbon and regenerated carbon transfer device, and so on to a massive water treatment and activated carbon filtration system.

BACKGROUND ART

In general, sewage and waste water treatment equipment is equipment that purifies all kinds of sewage and waste water, such as living sewage, industrial waste water or so on, up to a fixed standard, and discharges them.

This sewage and waste water treatment equipment is used in such a manner that sewage and waste water pass through a water treatment tank filled with an adsorbent so that a harmful component included in the sewage and waste water adsorbs due to the adsorbent, thereby performing purification.

Generally, the adsorbent filled in the water treatment tank mainly uses activated carbon having a large specific surface area and adsorption ability, and excellent removal ability of harmful substances, which is an amorphous substance mostly constituted of carbon.

This activated carbon, which is porous carbonaceous matter used as an adsorbent for various objects, has been used in the field of chemical industry through refining, removal of a toxic substance, decoloration, extraction separation, and so on, and has also been used in tap water treatment, waste water treatment, exhaust gas adsorption, a solvent collection, and so on for preventing environmental pollution, such as air pollution, waste treatment, water contamination, and so on, thereby showing a continuous increase in demand in various industrial fields.

Since this activated carbon mainly used as an adsorbent in industrial sewage and waste water treatment equipment shows a sudden decline in purification treatment ability when gaps formed on a surface of the activated carbon are filled with a toxic substance as a fixed time passes, the activated carbon has been actually used by being replaced or regenerated.

Generally, the maximum burden of large scale equipment for massive sewage and waste water treatment in terms of expenses, operation of the equipment, and so on is a part related with regeneration of the activated carbon, and there is a tendency to devote many efforts across the board for securing efficiency in the operation of the equipment by organically linking the working of waste water treatment and the working of activated carbon regeneration together.

A method of regenerating activated carbon has currently adopted a method of taking spent carbon out of a water treatment tank for conveying of a long distance out of the tank, and regenerating the spent carbon in activated carbon regeneration facilities, and thereafter conveying the regenerated activated carbon to its original position again and putting it into the water treatment tank, but it is disadvantageous in that an operating rate of water treatment facilities decreases such that time required for performing a series of regeneration work is delayed, a large burden of expenses incurred by a long time is imposed, and the intermediate hours required for operation of the water treatment tank are delayed, and is also disadvantageous in that an economic loss is largely generated due to a high loss rate of activated carbon occurring during a regeneration process.

Thus, through Korean Patent Registration No. 10-2092542, the applicant has suggested a new integrated waste water treatment system in which a device configured to automatically discharge and transfer spent carbon and to automatically put regenerated carbon using air and high-pressure water is installed at a position among water treatment facilities and activate carbon regeneration facilities.

However, in case of Korean Patent Registration No. 10-2092542 owned by the applicant, even though an economic and efficient system can be established because water treatment facilities, to which a plurality of water treatment tanks belong, are integrally operated with activated carbon regeneration facilities, to which a plurality of activated carbon regeneration tanks, the system has the limit which shows that a loss ratio of activated carbon showing a loss at a fixed ratio during the transfer of spent activated carbon and regenerated activated carbon is not completely removed. Furthermore, the actual circumstances are that a treatment technology suitable for environment protection has been required because there has been no system constitution intended for discharging condensate water occurring during the regeneration of activated carbon.

Also, a boiler structure intended for forming superheated steam used in the regeneration of activated carbon has been faced with various problems for advancement of the system as a new boiler structure having stability and reliability intended for forming efficient superheated steam has been required.

DETAILED DESCRIPTION OF THE INVENTION

Technical Problem

According to the present invention devised for solving the aforesaid problems, an object of the present invention is to provide a system, to which a method of adjusting a mixing ratio of water and activated carbon when spent carbon discharged from a water treatment tank is transferred and regenerated carbon supplied from an activated carbon regeneration tank is transferred, and transferring a mixture in a mixing state through a hose pump unit is applied, so that transfer efficiency of the spent carbon and the regenerated carbon can be improved, and a loss ratio of the spent carbon and the regenerated carbon can also be minimized.

Furthermore, another object of the present invention is to provide a system, which introduces a post-treatment technology for purifying condensate water having a high temperature occurring at a process of regenerating spent activated carbon using superheated steam by putting a decontaminant responding to a high temperature, thereby establishing a friendly-environmental regeneration system so that the condensate water occurring during regeneration of the activated carbon using superheated steam can be purified and discharged through post-treatment, and which maximizes energy efficiency by improving a boiler structure in order to optimize the conditions of superheated steam formation.

Technical Solution

According to a solution for solving the aforesaid problems, an exemplary embodiment of the present invention, as illustrated in FIG. 1 to FIG. 6, may provide an integrated system of activated carbon regeneration and water treatment, comprising: a plurality of water treatment tanks 10 configured to perform an adsorption treatment of impurities contained in waste water using activated carbon; a spent carbon storage tank 11 configured to store up spent carbon discharged from the water treatment tanks 10; at least one activated carbon regeneration tank 100 configured to perform a regeneration treatment of activated carbon supplied from the spent storage tank 11; and a regenerated carbon storage tank 13 configured to store up regenerated carbon discharged from the activated carbon regeneration tank 12, and then to supply it to the water treatment tanks 10, wherein a first transfer process of transferring the spent activated carbon from the water treatment tanks to the spent carbon storage tank 11, a second transfer process of transferring the spent activated carbon from the spent carbon storage tank 11 to the activated carbon regeneration tank 100, and a third transfer process of transferring regenerated activated carbon regenerated at the activated carbon regeneration tank 100 to the regenerated carbon storage tank 13 are realized by a transfer pump unit 200 configured to make a mixture of water and activated carbon or spent activated carbon flow into an elastic hose 220, and to perform transferring by compressing the elastic hose using a compression roller 250.

Effect of the Invention

According to an exemplary embodiment of the present invention, when spent carbon discharged from water treatment tanks, and regenerated carbon supplied from activated carbon regeneration tanks are transferred, a method of transferring a mixture in a mixing state through a hose pump unit by adjusting a mixing ratio of water and activated carbon is adopted, so it is effective for increasing transfer efficiency of the spent carbon and regenerated carbon, and for minimizing a loss ratio of the spent carbon and regenerated carbon.

Furthermore, since a post-treatment technology is introduced so that condensate water having a high temperature occurring during a process of regenerating the spent activated carbon using superheated steam purification can be purified using putting of a decontaminant responding to a high temperature, a friendly-environmental regeneration system can be established in such a manner that the condensate water, which is generated during the regeneration of activated carbon using the superheated steam, is purified and discharged by post-treatment.

In particular, since the condensate water occurring during the regeneration process of the spent activated carbon, to which the superheated steam is applied, is waste water having a high temperature, there is no need to establish separate heating facilities for reaction temperature treatment when purification is performed, and an appropriate decontaminant is putted so that purification treatment can be performed in a discharge process, that is, the economic purification treatment can be performed. Also, according to another exemplary of the present invention, the structure of a superheated steam formation boiler module, which forms superheated steam, can adopt a stable structure which shows that steam having a high temperature can be effectively generated, and damage generated due to heat can also be minimized, so working hours can be minimized.

Furthermore, according to the present invention, a new system is adopted in such a manner that water treatment facilities, to which a plurality of water treatment tanks belong, and activated carbon regeneration facilities, to which a plurality of activated carbon regeneration tanks belong, are integrally operated, and spent carbon and regenerated carbon are organically discharged from and putted into the water treatment facilities and the activated carbon regeneration facilities, so it is effective for improving the efficiency of system operation, economically operating the system, and increasing an operating rate of the water treatment facilities as well as decreasing a loss rate of the activated carbon.

In particular, transfer, such as the discharge of spent carbon in the water treatment tanks, supply of regenerated carbon, and so on, can be performed using a hose pump so that a loss of activated carbon can be minimized, and a friendly-environmental system can be established by a purification process of realizing purification by exactly using the potential heat of condensate water having a high temperature.

BRIEF DESCRIPTION OF THE DRAWINGS

FIG. 1 is a plane view showing the layout of an integrated system of activated carbon regeneration and water treatment according to one exemplary embodiment of the present invention (hereinafter referred to as "the present invention").

FIG. 2 is a block diagram showing a line constitution of the integrated system of activated carbon regeneration and water treatment according to one exemplary embodiment of the present invention.

FIG. 3 is a structural conceptual view of a transfer pump unit shown in FIG. 2, and FIG. 4 is a block diagram of the system which shows that the constitution shown in FIG. 2 is embodied on the basis of an activated carbon regeneration tank.

FIG. 5 and FIG. 6 illustrate a block diagram and a conceptual view of implementation showing that a purification process of purifying condensate water discharged from an activated carbon regeneration tank 100 is carried out by a condensate water purification module CL 300.

FIG. 7 illustrates the structure of a superheated steam formation module 400 configured to form superheated steam supplied to the activated carbon regeneration tank 100 described on the basis of FIG. 4.

FIG. 8 illustrates the structure of superheated steam heating pipes 451 in a coil shape according to one exemplary embodiment of the present invention.

FIG. 9 and FIG. 10 illustrate main constitutions of the superheated steam formation module.

FIG. 11 and FIG. 12 illustrate each structure of the activated carbon regeneration tank and an injection module according to the present invention.

MODE FOR CARRYING OUT THE INVENTION

The advantages and features of the present invention will clarify with reference to the exemplary embodiments which will be described in detail below based on the accompanying drawings. However, the present invention should not be limited to the exemplary embodiment described herein, but may be embodied in the other forms. On the contrary, the exemplary embodiments introduced herein are intended to bring the disclosed contents to perfection without an inconsistency, and to sufficiently serve those having ordinary skill in the art with the idea of the present invention.

The present invention will be hereinafter described in detail with reference to the accompanying drawings.

FIG. 1 is a plane view showing the layout of an integrated system of activated carbon regeneration and water treatment according to one exemplary embodiment of the present invention (hereinafter referred to as "the present invention"), FIG. 2 is a block diagram showing a line constitution of the integrated system of activated carbon regeneration and water treatment according to one exemplary embodiment of the present invention, FIG. 3 is a structural conceptual view of a transfer pump unit shown in FIG. 2, and FIG. 4 is a block diagram of the system which shows that the system constitution shown in FIG. 2 is embodied on the basis of an activated carbon regeneration tank.

The integrated system of activated carbon regeneration and water treatment according to the present invention is composed of a new integrated system of waste water treatment that integrally operates massive water treatment facilities to which a plurality of water treatment tanks belong, and minimum activated carbon regeneration facilities to which a plurality of activated carbon regeneration tanks belong, efficiently discharges and transfers spent carbon on the basis of a hose pump unit located at a position among the water treatment facilities and activated carbon regeneration facilities, and automatically puts regenerated carbon. Furthermore, it is composed of a new integrated system of waste water treatment that integrally operates massive water treatment facilities to which a plurality of water treatment tanks belong, and minimum activated carbon regeneration facilities to which a plurality of activated carbon regeneration tanks belong, discharges and transfers spent carbon having a minimized loss rate, and automatically puts regenerated carbon.

For this, referring to FIG. 1 to FIG. 4, the system according to the present invention comprises: a plurality of water treatment tanks 10 configured to perform an adsorption treatment of impurities contained in waste water using activated carbon; a spent carbon storage tank 11 configured to store up spent carbon discharged from the water treatment tanks 10; at least one activated carbon regeneration tank 100 configured to perform a regeneration treatment of activated carbon supplied from the spent storage tank 11; and a regenerated carbon storage tank 13 configured to store up regenerated carbon discharged from the activated carbon regeneration tank 12, and then to supply it to the water treatment tanks 10.

The water treatment tanks 10 are facilities that cause a harmful component contained in waste water to adsorb by making the waste water pass through an adsorbent filled into the inside, for example, activated carbon, and thereafter discharges, thereby performing discharging after purification. Unlike general water treatment tanks intended for completely waste water treatment only without facilities intended for regenerating activated carbon, since the water treatment tanks 10 have a structure that can perform discharging for regeneration of the activated carbon and can put regenerated carbon, it is useful in term of the structure, and it is also advantageous in that operation efficiency is favorable.

According to the present invention, as illustrated in FIG. 2, the structure of an existing invention is used for a conventional treatment operation performed in the water treatment tanks 10, but in a transfer process of transferring spent carbon, transfer pump units 200A, 200B, 200C having each hose pump unit rather than a discharging method, to which an existing pumping unit and high pressure water are applied, are used so as to cause a transfer of spent carbon, or regenerated activated carbon, which will be described below, so a loss of the activated carbon can be minimized.

That is, as illustrated in FIG. 2 and FIG. 3, a first transfer process of transferring spent activated carbon from the water treatment tanks to the spent carbon storage tank 11, a second transfer process of transferring the spent activated carbon from the spent carbon storage tank 11 to the activated carbon regeneration tank 100, and a third transfer process of transferring regenerated activated carbon, which has been regenerated, from the activated carbon regeneration tank 100 to the regenerated carbon storage tank 13 are realized by a transfer pump unit 200 configured to make a mixture, into which water and the activated carbon or spent activated carbon are mixed, flow into an elastic hose 220, and to compress the elastic hose using a compression roller 250, thereby performing transferring.

The transfer pump unit 200, i.e., 200A, 200B, and 200C, according to the present invention, as illustrated in FIG. 4, may comprise: a mixing state check module A that realizes a mixing ratio of the water to the activated carbon or spent activated carbon with respect to the mixture, in which activated carbon or spent activated carbon is mixed, in the standard range of 1 to 1.3 to 2.0, wherein the mixing state check module A comprises a sensor module a1 configured to check a state of the mixture and a control module a2 configured to adjust water supply and discharge so that the supply or discharge of water is realized in the standard range according to a sensing result of the sensor module a1; an inlet 220 configured to make the mixture, which has passed through the control module a2, flow into the inside of an elastic hose 230; a compression roller 250 configured to apply pressure to the elastic hose 230 and to perform compression and rolling movements; and a rotation driving part 255 configured to rotate the compression roller 250. That is, the transfer pump unit 100 may have a system structure that is used as a substitute for an existing conveying unit intended for compulsively transferring the spent carbon discharged from the water treatment tanks 10 to the spent carbon storage tank 11, and may perform a transfer in such a manner that the elastic hose 230 having elasticity is installed, a rotation of the compression roller 250 brings the elastic hose into contact with the compression roller so that the hose is compressed, and a strong sucking force occurs due to a restoration force which shows at the time when the elastic hose is again restored after being compressed, thereby sucking and transferring the spent carbon or the activated regeneration carbon using this sucking force.

This transfer method may transfer the mixture of the water and spent carbon in the water treatment tanks, and the mixture of the water and regenerated activated carbon in the activated carbon regeneration tank using a strong sucking force and a discharge force.

At this time, a mixing ratio of the water to the activated carbon or spent activated carbon with respect to the mixture, in which the water and the activated carbon or spent activated carbon are mixed, may be realized in the standard range of 1:1.3 to 2.0.

Most preferably, the mixing ratio of the water to the activated carbon or spent activated carbon with respect to the mixture, in which the water and the activated carbon or spent activated carbon are mixed, may be realized in the ratio of 1 to 1.5. In this range, when the water is mixed at an excessively high ratio, the sucking force is influenced as viscosity decreases, and when the water is mixed at an excessively low ratio, viscosity of the mixture resulting from mixing of the water and activated carbon increases, so transferring is hindered, and cracking of the activated carbon to pieces is generated. Accordingly, the mixing state check module A configured to adjust the mixing ratio of the water and spent carbon (or activated carbon) in the said optimum range has the sensor module a1 configured to check the mixing rate of the mixture which flows in real time, and the control module a2 configured to cause an inflow of water to be performed, or to cause water to be discharged in the optimum range so that the efficient transfer process can be controlled. As described, as the method of adjusting the mixing rate of the water and activated carbon, and transferring the mixture in a state of being mixed through a hose pump unit is adopted, the transfer efficiency of the spent carbon and regenerated carbon can be improved, and a loss rate of the spent carbon and regenerated carbon can be also minimized.

FIG. 4 illustrates a flow chart of arrangement for the main constitutions according to the present invention described above on the basis of FIG. 2.

The spent carbon is transferred through the first transfer pump unit 200A from the water treatment tanks 10 to the spent carbon storage tank 11, and is then transferred through the second transfer pump unit 200B from the spent carbon storage tank 11, thereby flowing into the activated regeneration tank through the inlet 13 located at an upper portion of the activated regeneration tank 100.

The activated carbon regeneration tank 100 contains spent activated carbon in the inside thereof, and also performs a washing process for the spent activated carbon, which is contained, or functions to realize regeneration by dehydrating and drying the spent activated carbon transferred by a water force, and performing spraying of superheated steam. As a matter of course, when discharge water having a high temperature occurring during this regeneration process is discharged, a purification work may be performed by a condensate water purification module 300.

Furthermore, in the inside of the activated carbon regeneration tank 100, a plurality of superheated steam injection modules S, i.e., S1 and S2, arranged in a horizontal structure are disposed at upper and lower portions so that steam can be supplied from the top to the bottom by the association of a lower steam distributor and an upper steam distributor of the activated carbon regeneration tank, and thus the regeneration efficiency of activated carbon as well as the operating ratio of facilities can be improved. The superheated steam supplied to the superheated steam injection modules S, i.e., S1 and S2, is formed in a superheated steam formation module 400 arranged at the outside of the activated carbon regeneration tank 100.

The superheated steam formation module 400 according to the present invention has a boiler having a special structure and a superheated steam formation part, which will be described below, so that steam formation efficiency can be enhanced.

A plurality of superheated steam supply modules 120*a*, 120*b*, 120*c*, 120*d* having a superheated steam supply line 125, which communicate with the activated regeneration tank 100, may supply superheated steam to activated carbon.

The lower injection module S2, which injects the superheated steam from a lower portion to an upper portion of the activated carbon regeneration tank 100, and a plurality of upper injection modules S1, which are disposed on a top inner side of the activated carbon regeneration tank 100, and which eject the superheated steam to the lower portion, are realized in such a manner that the superheated steam is ejected onto the spent activated carbon from the upper portion as well as the lower portion, so operation efficiency and economic efficiency of the facilities related with the regeneration treatment of activated carbon can be increased, the structure of the facilities can be simplified, a production cost can be reduced, and the regeneration efficiency of activated carbon can be improved.

The upper injection modules S1, which eject superheated steam, according to the present invention may cause the superheated steam formed by the superheated steam formation module 400 to be supplied through the superheated steam supply line 125 and may control whether or not the superheated steam is supplied through each of the superheated steam supply valves 121, 122, 123, 124 and 125.

When the regeneration process of the activated carbon is performed by injection of the superheated steam, discharge water having a high temperature occurring from the regeneration process may be discharged to the outside of the activated carbon regeneration tank 100, and according to the present invention, a purification process may be performed by a condensate water purification module RT 300 configured to purify condensate water discharged from the activated regeneration tank RT.

FIG. 5 and FIG. 6 illustrate a block diagram and a conceptual view of implementation which show that the purification process of purifying the condensate water discharged from the activated carbon regeneration tank 100 is carried out by the condensate water purification module CL 300.

The condensate water purification module CL 300 may comprise: a condensate water storage tank T connected to a lower portion of the activated carbon regeneration tank 100, and configured to store up condensate water occurring during the regeneration working of activated carbon; a condensate water discharge line 310 configured to discharge the condensate water from the condensate water storage tank T; a condensation heat control part 320 configured to adjust a temperature of the condensate water, which is discharged, to a first temperature; a decontaminant supply part 330 configured to put a decontaminant into the condensate water, the temperature of which has been adjusted to the first temperature; a first mixing part 340 configured to mix the condensate water into which the decontaminant is putted; a reaction part 350 configured to cause the condensate water mixed with the decontaminant to stay, and to generate a purification reaction by performing stirring; and a cooling heat control part 380 configured to adjust a discharge temperature of a second condensate water, a reaction of which has been completed in the reaction part 350, to a second temperature.

The condensate water purification module CL may further comprise: a counteragent supply part 360 configured to put a counteragent into the second condensate water discharged from the reaction part 350 in order to induce a neutral reaction; a second mixing part 370 configured to mix the second condensate water and the counteragent, thereby generating the neutral reaction; and a discharge water detection part 390 configured to measure acidity pH of the second condensate water discharged through the cooling heat control part 380, and to calculate and adjust an amount of the counteragent which is putted at the counteragent supply part 460.

Referring to FIG. 5 and FIG. 6, a function and a purification treatment process concerning the main constitutions according to the present invention will be hereinafter described.

First of all, the discharge water discharged from the activated carbon regeneration tank 100 is discharged along the condensate water discharge line 310 according to the present invention. In this case, since the discharge water, which is discharged, is discharge water used in a regeneration process using superheated steam, the temperature thereof generally corresponds to a high temperature in the range of 105 °C to 110 °C.

Thus, according to the present invention, the condensation heat control part 320 including a heat exchanger performs controlling the temperature to a reaction temperature for minimizing a reaction by mixing of a decontaminant. That is, the constitution of the condensation heat control part 420 may be realized with the constitution of the heat exchanger that adjusts the temperature of the condensate water having a high temperature to the most suitable temperature for an oxidation reaction, and the condensate water resulting from sludge treatment, itself, may generally function to adjust the temperature range of heated water having a high temperature (i.e., 105 °C or more) to the range of another high temperature (i.e., 95 °C).

Next, a liquid decontaminant may be supplied to discharge water that has passed through the condensation heat control part 320. That is, the constitution of the decontaminant supply part 330 according to the present invention may comprise a supply line configured to supply the liquid decontaminant (persulfate being applied to one exemplary embodiment of the present invention) through a separate storage tank 331, and may be realized in such a manner that persulfate can be directly putted into the pipe line of the condensate water. The putted persulfate may stay at a first mixing part 440 and may be primarily mixed.

In particular, in the constitution which purifies the condensate water, persulfate, such as sodium persulfate, may most efficiently bring about a purification reaction in the range of the high temperature (i.e., 95 °C), and according to the present invention, since discharge water discharged from a device system using superheated steam has a high temperature, it is advantageous in that a heat source device, such as a separate heating device for the discharge water and so on, is not required.

Then, the reaction part 450 is configured so that the condensate water and decontaminant, which are mixed, can be received in a fixed reactor at a specific temperature, and a purification reaction can be realized. It is preferable to provide a fixed stirring function so that the liquefied persulfate used as the decontaminant, and the discharge water (i.e., condensate water) can respond to each other, and the purification reaction can be maximized.

Furthermore, according to the present invention, it is preferable to provide the counteragent supply part 460 so that acidity of the discharge water (i.e., condensate water), which is purified, can be adjusted. To do so, according to the present invention, the counteragent supply part may supply counteragent to a storage tank intended for storing up the counteragent (for example, NaOH) in a liquid state, may directly supply the liquid counteragent to a discharge line through which the condensate water is discharged, and may adjust acidity of the condensate water which is discharged. In the event that the condensate water is discharged by a purification reaction resulting from responding to persulfate, it has acidity showing a pH level of about 1 to 2, but the condensate water may be adjusted so as to have the acidity of neutrality or weak basicity using a neutral reaction.

In particular, the counteragent and condensate water supplied to the pipe line are mixed in a second mixing part 470. Furthermore, with respect to an amount of the counteragent, which is putted, PH of the discharge water is detected by the discharge water detection part 490, and the amount of the counteragent corresponding thereto is automatically calculated so that putting of the counteragent can be performed.

Furthermore, according to the present invention, the cooling heat control part 480 may be provided, and that is, since the condensate water, the purification reaction and the neutral reaction of which have been completed, has a high temperature of 90 or so, a cooling device intended for cooling the temperature to an appropriate temperature may be provided so that the temperature of the discharge water, which is discharged, can be discharged in a state of being remarkably reduced.

The discharge water having a high temperature occurring during the regeneration process of activated carbon may be purified by putting of decontaminant, and efficiency of the decontaminant may be revealed by utilization of the temperature of the discharge water without a separate heating device for the discharge water so that an economic and friendly-environmental device structure can be realized. FIG. 7 illustrates a structure of the superheated steam formation module 400, which forms superheated steam supplied to the activated carbon regeneration tank 100 mentioned in the sections in connection with FIG. 4.

Referring to FIG. 4 and FIG. 7, the superheated steam formation module 400 according to the present invention generates superheated steam and functions to supply the superheated steam through a pipe.

In particular, the superheated steam formation module 400 according to the present invention may generate superheated steam supplied to the superheated steam injection modules S and may comprise: a boiler having a burner 442 disposed at an upper portion of a combustion chamber 441 and including a flame interception net 443 disposed at a lower portion of the burner; and a superheated steam formation part 450 including steam heating pipes 451 disposed to be separated from each other and surrounding an outer circumference of the flame interception net 443, and a steam inflow pipe 452 and a steam discharge pipe 453 connected to one end and another end of the steam heating pipes 451.

Furthermore, the superheated steam formation part 450 may cause temperature control to be performed by mixing steam having a high temperature and steam having a low temperature in such a manner that the steam inflow pipe is formed on one end of the steam heating pipes 451 so as to communicate with the steam supply chamber 147, the superheated steam discharge pipe 453 is formed on another end so as to communicate with the superheated steam supply part 420, and the steam inflow pipe 451 and the steam discharge pipe 4512 communicate with the steam control pipe 454.

Referring to FIG. 7 to FIG. 10, a function and structure of the detailed constitution of the superheated steam formation module 400 according to the present invention are described.

The boiler 440 of the superheated steam formation module 400 according to the present invention has the combustion chamber 411 and includes the burner 442 disposed at a center of the upper portion. The flame interception net 443 is formed in a lower direction of the burner so that flames of the burner 443 spread in a longitudinal direction, thereby preventing a flame from being directly dashed against the steam heating pipes 451 of the superheated steam formation part 450, which will be hereinafter described.

In a lower portion of a combustion chamber 141, a ring-shaped lower water tank 446 is formed, and in an upper portion, a plurality of water tank pipes 444, which make the lower water tank 446 vertically communicate with a steam supply chamber 447, are connected to each other at a fixed interval, and the lower water tank 446 and the steam supply chamber 147 are connected to a water gauge 445 so that the quantity of water contained in the inside of the water tank pipes 444 can be confirmed.

The superheated steam formation part 450 prevents flames of the combustion chamber from being directly dashed against the superheated steam heating pipes 451 in such a manner that the superheated steam heating pipes are formed in an inner side of the water tank pipes 444 of the combustion chamber 441, and a flame interception net 443 is located at an upper portion of an inner circumstance of the superheated steam heating pipes 451. Also, time and an area required for a heat exchange in the combustion chamber are enlarged to the maximum so that superheated steam having a high temperature can be smoothly and efficiently formed.

The superheated steam heating pipes 451, as illustrated in FIG. 9, may be formed in various shapes, such as a coil shape, a loop shape, a mixed shape resulting from mixing the coil and loop shapes, and so on.

According to FIG. 8 showing one exemplary embodiment of the present invention and illustrating a structure of the superheated steam heating pipes 451 having a coil shape, a heat deflection prevention plate 455 is combined with upper and lower sides of the superheated steam heating pipes 451 having the coil shape, and each of a plurality of interval support bodies 456 are successively inserted into a gap between the pipes so that the superheated steam heating pipes 451 can be uniformly, strongly, and stably supported. Furthermore, this structure can prevent a heat loss, and can also obtain superheated steam having a desired temperature as smooth steam is again heated.

Furthermore, the steam inflow pipe 452 is formed on one end of the superheated steam heating pipes 451 so as to communicate with the steam supply chamber 147, and the steam discharge pipe 453 is formed on another end so that steam having a high temperature can be discharged. In addition, the steam discharge pipe 453, and a main steam supply pipe 421 of the superheated steam supply part 420 communicate with the steam supply pipe 457 so that steam having a high temperature can be smoothly supplied to and ejected from the inside of the activated carbon regeneration tank.

Also, the steam inflow pipe 452 and the steam discharge pipe 453 communicate with the steam control pipe 454 so that steam having a high temperature and steam having a low temperature can be efficiently mixed, and thus steam having a desired temperature can be efficiently supplied.

A stage of performing a regeneration process using superheated steam according to the present invention comprises: receiving organic matter of the surface of spent activated carbon, and a water contamination substance, which flow into the inside of the activated carbon regeneration tank shown in FIG. 4, in the activated carbon regeneration tank, thereby dehydrating and drying them; and receiving superheated steam having a high temperature supplied from the aforesaid superheated steam boiler, and spraying it onto activated carbon, thereby removing efficiently the organic matter and water contamination substance intensely contained in pores of the activated carbon. After this, spraying the steam having a high temperature, and then supplying washing water from a lower portion of the regeneration tank to an upper portion through a backwash water supply pipe are performed so that the separated organic matter and water contamination substance can be removed and discharged, and the discharge water may be purified by the condensate water purification module CL.

FIG. 11 and FIG. 12 illustrate an inner structure of the activated carbon regeneration tank 100 described in the sections related with FIG. 4, and an arrangement structure and the detailed plane view of the upper injection module S1 having a horizontal injection structure.

According to the structure shown in FIG. 12, the upper injection module S1 having a horizontal structure according to the present invention is illustrated by example, which shows that a structure of a main horizontal pipe 20*a* is realized in a pipe type structure so that the main horizontal pipe is constituted to have a uniform diameter, but in this case, since pressure applied to a head end portion A" into which superheated steam flows increases, even though the superheated steam supplied to the inside of the main horizontal pipe 20*a* enters into the inside from a head end portion A" through a tail end portion B", no supplied pressures decrease, so the pressures can be maintained to have a pressure difference between the pressures applied to the head end portion and the tail end portion ranging from % to 10%. That is, the structure is realized in such a manner that when an air distribution hole F1 formed in the main horizontal pipe 20*a* provides an air pressure in the inside of a sub-horizontal pipe 20*b* located at a lower portion, each length of the sub-horizontal pipe 20*b* and another one is gradually reduced centering around the other sub-horizontal pipe Cl located at a central portion, and thus under the condition that a pressure difference between air supply pressures applied to the head end portion and the tail end portion ranges from 5% to 10%, a uniform pressure can be supplied, and uniform injection can be performed toward a lower portion through injection holes F2, F3 of the sub-horizontal pipe 2*b*.

FIG. 12 illustrates an arrangement structure and the detailed plane view of the upper injection module S1 having a horizontal injection structure arranged in the inside of the activated carbon regeneration tank 100 described in the sections related with FIG. 11.

According to the structure shown in FIG. 12, the upper injection module S1 having a horizontal structure according to the present invention is illustrated by example, which shows that a structure of a main horizontal pipe 20*a* is realized in a pipe type structure so that the main horizontal pipe is constituted to have a uniform diameter, but in this case, since pressure applied to a head end portion A" into which superheated steam flows increases, even though the superheated steam supplied to the inside of the main horizontal pipe 20*a* enters into the inside from a head end portion A" through a tail end portion B", no supplied pressures decrease, so the pressures can be maintained to have a pressure difference between the pressures applied to the head end portion and the tail end portion ranging from % to 10%. That is, the structure is realized in such a manner that when an air distribution hole F1 formed in the main horizontal pipe 20*a* provides an air pressure in the inside of a sub-horizontal pipe 20*b* located at a lower portion, each length of the sub-horizontal pipe 20*b* and another one is gradually reduced centering around the other sub-horizontal pipe Cl located at a central portion, and thus under the condition that a pressure difference between air supply pressures applied to the head end portion and the tail end portion ranges from 5% to 10%, a uniform pressure can be supplied, and uniform injection can be performed toward a lower portion through injection holes F2, F3 of the sub-horizontal pipe 2*b*.

As described above, the detailed exemplary embodiments have been explained in the detailed description of the present invention. However, various modifications are possible from the exemplary embodiments, without departing from the category of the present invention. The technical idea of the present invention should not be limited to and defined by the exemplary embodiment, but should be defined within the equivalent scope of the claims as well as the scope as disclosed in the claims.

What is claimed is:

1. An integrated system of activated carbon regeneration and water treatment, comprising:

a plurality of water treatment tanks configured to perform an adsorption treatment of impurities contained in waste water using activated carbon;

a spent carbon storage tank configured to store up spent carbon discharged from the water treatment tanks;

at least one activated carbon regeneration tank configured to perform a regeneration treatment of activated carbon supplied from the spent carbon storage tank;

a regenerated carbon storage tank configured to store up regenerated carbon discharged from the activated carbon regeneration tank, and then to supply the regenerated carbon to the water treatment tanks;

a transfer pump unit comprising a hose pump and configured to make a mixture of water and the activated carbon or spent activated carbon and to flow into an elastic hose, and to compress the elastic hose into a compression roller, thereby carrying out transferring of the mixture while minimizing mechanical degradation and loss of the activated carbon, wherein the transfer pump unit is configured to perform a first transfer process of transferring spent activated carbon from the water treatment tanks to the spent storage tank, a second transfer process of transferring the spent activated carbon from the spent storage tank to the activated carbon regeneration tank, and a third transfer process of transferring the regenerated activated carbon, regenerated of which has been completed, from the activated carbon regeneration tank to the regenerated carbon storage tank, wherein the transfer pump unit comprises: a mixing state check module configured to realize a mixing ratio of the water to the activated carbon or spent activated carbon with respect to the mixture, into which the water and the activated carbon or spent activated carbon are mixed, in a ratio of 1:1.3 to 2.0, wherein the mixing state check module includes a sensor module configured to check a state of the mixture and a control module configured to adjust moisture supply and discharge so that supply or discharge of the water can be performed in the standard range according to a detection result of the sensor module; an inlet configured to make the mixture, which has passed through the control module, flow into the inside of the elastic hose; the compression roller configured to apply pressure to the elastic hose and to perform compression and rolling movements;

a rotary driving part configured to rotate the compression roller;

a putting part is provided at an upper portion of the activated carbon regeneration tank, and is configured to put the spent activated carbon into the activated carbon regeneration tank;

a drain device configured to discharge the activated carbon is provided at a lower portion of the activated carbon regeneration tank, and at least one or more superheated steam injection modules is provided inside the activated carbon regeneration tank and configured to eject superheated steam onto the spent activated carbon;

a condensate water storage tank configured to store up condensate water discharged from the activated carbon regeneration tank and having a first high temperature in a range of 105 °C to 110 °C discharged through a water discharge part located at a lower portion of the activated carbon regeneration tank; and a condensate water purification module configured to purify the condensate water stored in the condensate water storage tank by adding a decontaminant responding to the first high temperature into the condensate water adjusted to a second high temperature of about 90 °C by a condensation heat control part of the condensate water purification module, and perform stirring.

2. The integrated system of activated carbon regeneration and water treatment of claim 1, wherein the one or more superheated steam injection modules include at least two or more unit injection modules arranged in parallel so that one unit injection module of the at least two or more unit injection modules is located next to an other injection unit module of the at least two or more unit injection modules.

3. The integrated system of activated carbon regeneration and water treatment of claim 1, wherein the condensate water purification module further comprises: a counteragent supply part configured to put a counteragent into the second condensate water discharged from the reaction part in order to induce a neutral reaction; a second mixing part configured to mix the second condensate water and the counteragent, thereby generating the neutral reaction; and a discharge water detection part configured to measure acidity of the second condensate water discharged through the cooling heat control part, and to calculate and control an amount of the counteragent to be input at the counteragent supply part.

* * * * *